UNITED STATES PATENT OFFICE.

OTTO CHARLES BILLETER, OF BASEL, SWITZERLAND, ASSIGNOR TO THE CORPORATION OF CHEMICAL WORKS, FORMERLY SANDOZ, OF BASEL, SWITZERLAND.

PROCESS OF MAKING CAMPHENE.

No. 891,033.    Specification of Letters Patent.    Patented June 16, 1908.

Application filed June 24, 1907. Serial No. 380,463.

*To all whom it may concern:*

Be it known that I, OTTO CHARLES BILLETER, doctor of philosophy, chemist, and resident of 23 Rotbergerstrasse, Basel, Switzerland, have invented new and useful Improvements in the Manufacture of Camphene, of which the following is a specification.

As is known, pinene hydrochlorid is only incompletely decomposed by soda lye alone without the addition of a solvent even when the operation is conducted in the autoclave and at a high temperature. The hydrochloric acid is however split off quantitatively if the reaction is performed in a medium which will completely or partly dissolve not only the saponifying agent but also the pinene hydrochlorid. Suitable solvents for this purpose are in particular weak acids such as phenols, naphthols, acetic acid or stearic acid, these even allowing of the use of weaker bases such as oxid of zinc, copper or lead.

Having in mind the property possessed by the higher alcohols and by the carbohydrates of largely dissolving lime to form strongly basic alcoholates and saccharates, I conceived the idea of employing alkalies and soluble earth alkali derivatives for the purpose of saponifying pinene hydrochlorid, and I found as a result of experiment that pinene hydrochlorid can be readily converted into camphene free from chlorin by the action of soda lye or lime water and glycerin, mannite, dextrin, beet-sugar, glucose or starch. During this operation the soluble carbohydrates are entirely destroyed while the insoluble carbo-hydrates are only partly destroyed, both being converted totally or partially into salts, the most valuable of which are those of lactic acid. Lactic acid can be readily isolated as the free acid or as soluble salt and is therefore a very valuable by-product. This formation of the acid requires a strong excess of alkali.

Example I. 340 parts of pinene hydrochlorid are mixed with 340 parts of glycerin, 375 parts of 33% soda lye and 100 parts of water and are heated in an autoclave for 12 hours at 160°C. with constant stirring. When the reaction is finished the camphene free from chlorin is distilled with steam.

Example II. 170 parts of lime are converted into lime water with 480 parts of water and are mixed with 345 parts of beet sugar. To the thick paste which is formed, are further added 345 parts of pinene hydrochlorid and the whole is heated at 170°C. in an autoclave provided with a stirrer until the camphene which is formed proves to be free from chlorin. The operation lasts a little more than 12 hours. The melt is then diluted with water, the excess of lime is neutralized with sulfuric acid and the camphene formed is distilled off with steam. From the remaining solution the whole of the lime is precipitated with sulfuric acid, the filtered acid solution is saturated with carbonate of zinc and the lactate of zinc is obtained by crystallization from the concentrated solution.

Example III. 600 parts of lime water prepared from 170 parts of lime are stirred with 345 parts of potato or rice starch and to the thick partly solid paste are added 345 parts of pinene hydrochlorid. The operation is conducted in the same way as above.

A test of the oil is taken from the autoclave and distilled over with steam; the camphene is wholly free from chlorin as soon as the liquid distilled over, when brought on a gauze of copper wire into the flame of a Bunsen burner, no longer shows a green coloration of the flame.

In the examples given the lime can of course be replaced if desired by strontium oxid or barium oxid and the potato or rice starch by their soluble conversion products such as soluble starch, dextrin, starch sugar or mixtures thereof. Further the concentration can be varied within wide limits.

The invention consists substantially in heating pinene hydrochlorid at relatively high temperatures and under pressure with alkalies in the presence of higher alcohols or carbohydrates, or in similarly heating the pinene hydrochlorid with calcium, strontium or barium oxid after having brought the above mentioned earth alkalies into soluble form by means of the higher alcohols or carbohydrates.

Now what I claim and desire to secure by Letters Patent is the following:

1. The process of manufacturing camphene which consists in heating, under pressure, pinene hydrochlorid together with alkalies and organic bodies of the fatty series, that contain more than one hydroxyl-group, stirring the mixture, and distilling off the camphene with steam.

2. The process of manufacturing camphene which consists in heating, under pressure, pinene hydrochlorid together with alkalies and carbo-hydrates, stirring the mixture and distilling off the camphene with steam.

3. The process of manufacturing camphene which consists in heating, under pressure, pinene hydrochlorid together with earth alkalies and carbo-hydrates, stirring the mixture, and distilling off the camphene with steam.

4. The process of manufacturing camphene which consists in heating, under pressure and at elevated temperatures, pinene hydrochlorid together with earth alkalies and carbo-hydrates, stirring the mixture, and distilling off the camphene with steam.

5. The process of manufacturing camphene which consists in heating, under pressure and at elevated temperatures, pinene hydrochlorid together with lime water and sugar, stirring the mixture, and distilling off the camphene with steam.

In testimony, that I claim the foregoing as my invention, I have signed my name in presence of two witnesses, this first day of June, 1907.

OTTO CHARLES BILLETER.

Witnesses:
MELCHIOR BÖNIGER,
GEORGE WAGNER.